(12) United States Patent
Labbe et al.

(10) Patent No.: US 10,164,525 B2
(45) Date of Patent: Dec. 25, 2018

(54) VOLTAGE REGULATOR WITH IMPROVED TRACKING OF A REFERENCE VOLTAGE

(71) Applicant: SNAPTRACK, INC., San Diego, CA (US)

(72) Inventors: Benoit Labbe, Cambridge (GB); Gerard Wimpenny, Cambridge (GB)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 15/574,382

(22) PCT Filed: May 26, 2016

(86) PCT No.: PCT/US2016/034361
§ 371 (c)(1),
(2) Date: Nov. 15, 2017

(87) PCT Pub. No.: WO2016/191570
PCT Pub. Date: Dec. 1, 2016

(65) Prior Publication Data
US 2018/0145589 A1 May 24, 2018

(30) Foreign Application Priority Data

May 28, 2015 (GB) .................................. 1509204.2

(51) Int. Cl.
*H02M 3/156* (2006.01)
*G05F 1/56* (2006.01)
*H02M 1/00* (2006.01)

(52) U.S. Cl.
CPC .............. *H02M 3/156* (2013.01); *G05F 1/56* (2013.01); *H02M 2001/0009* (2013.01); *H02M 2001/0025* (2013.01)

(58) Field of Classification Search
CPC ......... H02M 3/156; H02M 2001/0009; H02M 2001/0025; G05F 1/56
See application file for complete search history.

(56) References Cited

U.S. PATENT DOCUMENTS

| 4,975,820 A | 12/1990 | Szepesi | |
|---|---|---|---|
| 5,982,160 A * | 11/1999 | Walters | H02M 3/156 323/222 |
| 6,441,597 B1 * | 8/2002 | Lethellier | H02M 3/158 323/222 |

(Continued)

FOREIGN PATENT DOCUMENTS

| CN | 104022648 A | 9/2014 |
|---|---|---|
| WO | WO-8903609 A1 | 4/1989 |
| WO | WO-2014118341 | 8/2014 |

OTHER PUBLICATIONS

International Search Report and Written Opinion—PCT/US2016/034361—ISA/EPO—dated Sep. 9, 2016.

*Primary Examiner* — Emily P Pham
(74) *Attorney, Agent, or Firm* — Patterson & Sheridan, L.L.P.

(57) ABSTRACT

There is disclosed a voltage regulator, including a switching stage, for generating an output voltage, the voltage regulator comprising a feedback path for controlling the switching stage, in which a feedback signal in the feedback path is ramp-compensated, the ramp for the ramp compensation being generated from an output of the switching stage.

19 Claims, 11 Drawing Sheets

(56) References Cited

U.S. PATENT DOCUMENTS

| | | | | |
|---|---|---|---|---|
| 6,812,677 B2 * | 11/2004 | Walters | ............... | H02M 3/156 323/275 |
| 7,109,693 B2 * | 9/2006 | Yoshida | ............. | H02M 3/1563 323/282 |
| 7,511,472 B1 * | 3/2009 | Xia | ..................... | G01R 21/133 323/282 |
| 8,698,475 B2 * | 4/2014 | Dong | ................... | H02M 3/156 323/282 |
| 8,947,061 B2 * | 2/2015 | Hayes | ............... | H02M 3/1563 323/282 |
| 9,081,403 B1 | 7/2015 | Leone et al. | | |
| 9,653,992 B2 * | 5/2017 | Yuan | ................... | H02M 3/156 |
| 2014/0084883 A1 | 3/2014 | Tanabe | | |
| 2015/0311798 A1 | 10/2015 | Yuan et al. | | |
| 2016/0006397 A1 | 1/2016 | Wimpenny | | |
| 2016/0204704 A1 * | 7/2016 | Cao | ..................... | H02M 3/156 323/271 |

* cited by examiner

VOLTAGE REGULATOR WITH IMPROVED TRACKING OF A REFERENCE VOLTAGE

CROSS-REFERENCE TO RELATED APPLICATIONS

This application is a national stage application under 35 U.S.C. 371 of PCT/US2016/034361, filed May 26, 2016, which claims the benefit of Great Britain Patent Application Serial No. 1509204.2, filed on May 28, 2015, both of which are incorporated herein by reference in their entirety.

BACKGROUND OF THE INVENTION

Field of the Invention

The invention is concerned with an apparatus for generating a voltage tracking a reference voltage utilising a current control stage. The invention is additionally concerned, but not exclusively so, with such apparatus utilising a voltage control stage. An example implementation of the invention is in generation of a modulated supply voltage for an envelope tracking power amplifier.

Description of the Related Art

Figure 1:
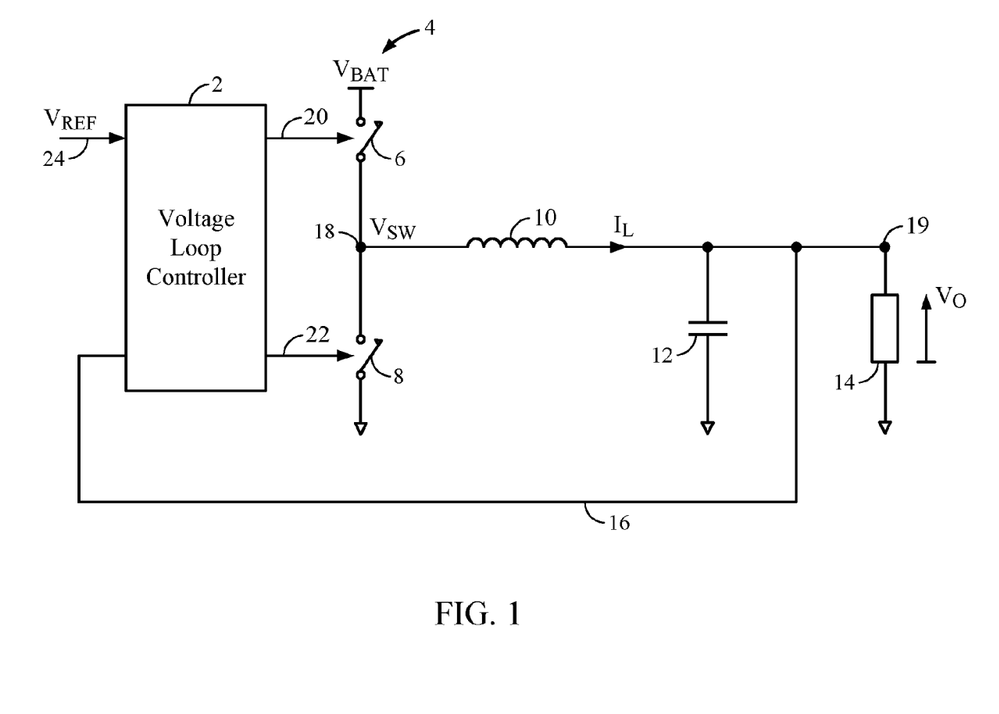
FIG. 1 illustrates an example apparatus architecture for generating an output voltage tracking a reference voltage utilising a voltage control loop.

FIG. 1 illustrates an arrangement in which a voltage control loop is used to maintain an output voltage $V_O$. A measurement of an output voltage level is fed back to a voltage loop controller. A voltage loop controller 2 controls a pair of switches 6,8 of a switching stage 4 in dependence on the fed back output voltage $V_O$ on line 16 and a reference voltage signal $V_{REF}$ on line 24. The switching stage 4 comprises a supply switch 6 connected to connect a switching node to a battery voltage $V_{BAT}$ and a ground switch 8 connected to connect the switching node to electrical ground. The voltage loop controller 2 generates two output control signals on lines 20,22, one for each switch. The common connection point of the switches 6 and 8 is a switching node 18 at which a switching voltage $V_{SW}$ is developed. An inductor 10 is connected between the switching node 18 and an output node 19. An inductor current $I_L$ is established in the inductor. A capacitor 12 is connected between the output node 19 and electrical ground. A load 14 is connected between the output node 19 and electrical ground. The output voltage $V_O$ is developed across the load 14 and developed at the output node. The output voltage controller 2 controls the switches of the switching stage 4 to maintain a desired output voltage $V_O$ at the output node 19. The output voltage controller receives the reference voltage $V_{REF}$ on line 24, and controls the switching of the supply and ground switches 6,8 in order to control the output voltage $V_O$ to track the reference voltage $V_{REF}$, based on the fed back output voltage signal.

Figure 2:
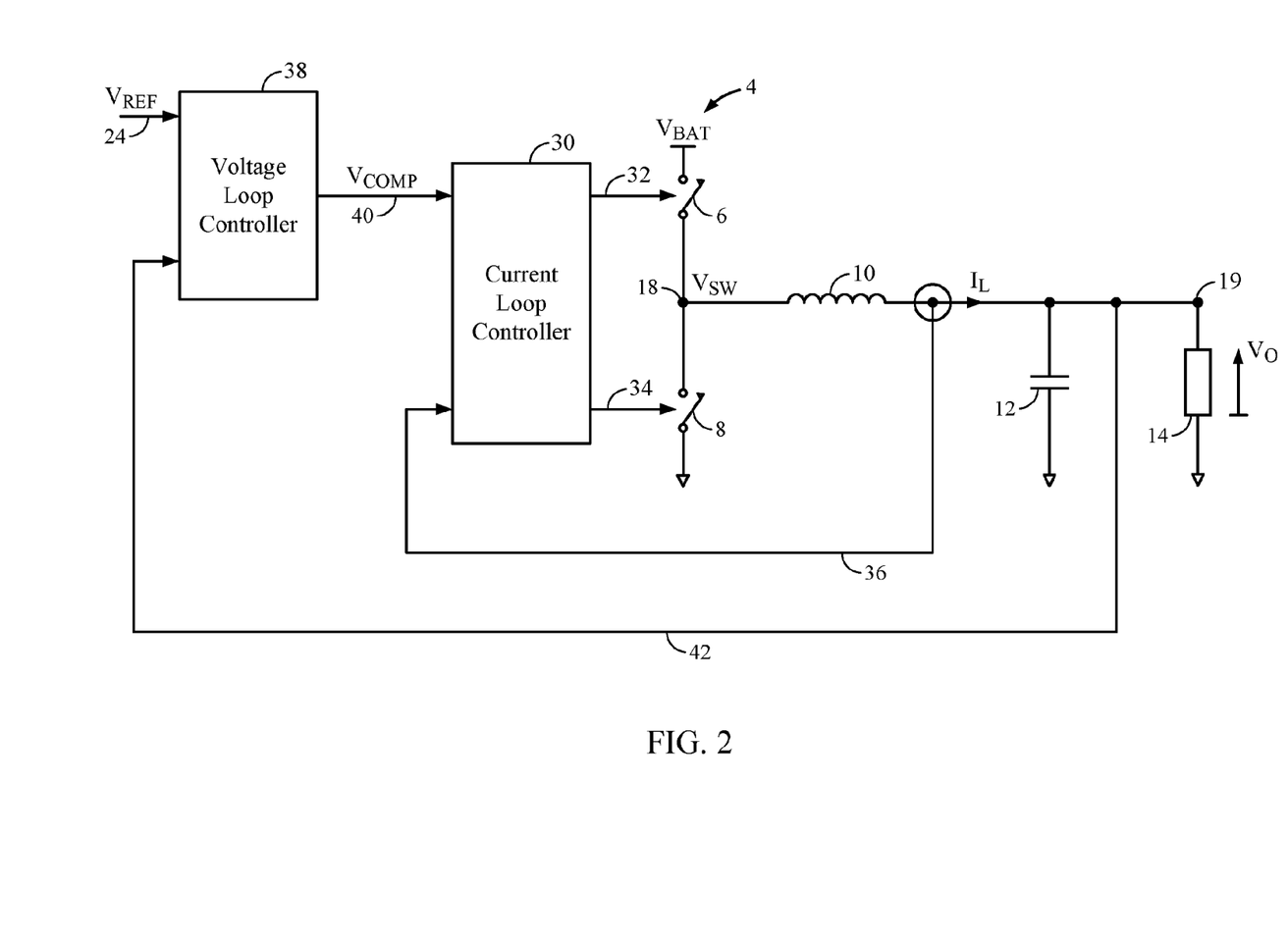
FIG. 2 illustrates an example apparatus architecture for generating an output voltage tracking a reference voltage utilising a voltage control loop and a current control loop.

FIG. 2 illustrates an enhanced arrangement in which both a voltage control loop and a current control loop are used to maintain the output voltage $V_O$. Where elements of FIG. 2 correspond to elements of FIG. 1, likes reference numerals are used.

As in FIG. 1, a measurement of the output voltage signal $V_O$ is fed back to a voltage loop controller 38. In this arrangement, a current loop controller 30 is additionally provided, between the voltage loop controller 38 and the switching stage 4.

The voltage loop controller 38 receives the reference signal on line 24, and also receives as a feedback signal the voltage at the output node 19, provided on a feedback line 42. The voltage loop controller 38 generates a first control signal on line 40, which is a compensation voltage $V_{COMP}$, to the current loop controller 30. A second input to the current loop controller 30 is the current flowing in the inductor 10: this is shown as detected at the terminal of the inductor connected to the output node, but it may also be detected at the other terminal of the inductor, or by measuring the voltage drop across the inductor 10.

The output of the current loop controller is control signals on lines 32 and 34 controlling the switches 6, 8 of the switching stage 4.

In this arrangement the voltage loop controls the current loop, and the current loop controls the generation of the output voltage $V_O$. The current loop ensures that the current developed in the inductor 10 is proportional to the compensation voltage $V_{COMP}$ on line 40. The voltage loop controller 38 generates $V_{COMP}$ so that the current flowing in the inductor is high enough to maintain the output voltage at the desired value.

It is an aim of the invention to provide an improvement to an apparatus such as shown in FIG. 2, utilising a current control loop.

SUMMARY OF THE INVENTION

In one aspect there is provided a voltage regulator, including a switching stage, for generating an output voltage, the voltage regulator comprising a feedback path for controlling the switching stage, in which a feedback signal in the feedback path is ramp-compensated, the ramp for the ramp compensation being generated from an output of the switching stage.

The feedback signal may be generated by applying a ramp compensation to a representation of the current flowing in the output of the switching stage.

There may be provided: an inductor having a first terminal connected to the switching stage and a second terminal connected to a voltage; and a series connected first resistor and first capacitor connected in parallel across the inductor, wherein the representation of the current flowing in the output of the switching stage is obtained by measuring a voltage difference across the first capacitor. There may be provided a second capacitor having a first terminal connected to the second terminal of the inductor and a second resistor having a first terminal connected to the second terminal of the second capacitor, the second capacitor and second resistor for generating a slope signal. There may be provided a feedback comparator having a first input connected to the connection point between the first resistor and first capacitor, and a second input connected to the connection point between the second capacitor and second resistor, the output of the comparator generating the feedback signal. There may be provided a switch connected in parallel with the second capacitor, wherein when the switch is open the comparator provides a feedback signal which represents the current flowing in the inductor and when the switch is open the comparator generates the ramp compensated feedback signal. The switch may be controlled such that when the output of the switcher block is connected to electrical ground, the switch is closed, and when the output of the switcher block is not connected to electrical ground, the switch is opened.

The voltage regulator may further comprise a first comparator for comparing the output voltage with a reference voltage to provide a comparison voltage, and a second comparator for comparing the comparison voltage with the ramp compensated feedback and providing a control input to the switching stage. The voltage generator may further include a linear amplifier and a power amplifier, the power amplifier for receiving a signal to be amplified, and the linear amplifier for receiving an envelope of the signal to be amplified, a third capacitor connected between the output of the linear amplifier and the second terminal of the inductor, and the second terminal of the inductor connected to a power supply input of the power amplifier, a third comparator connected in parallel across the capacitor and having an output connected to the first comparator, wherein the reference voltage is indicative of a desired voltage to be developed across the third capacitor.

A regulated buck circuit may including the voltage regulator and comprise the voltage generator and wherein there is provided a voltage source connected to a supply input of the switching stage, the second terminal of the second resistor is connected to electrical ground, and wherein an output voltage is formed in a load connected at the second terminal of the inductor.

A regulated boost circuit may include the voltage regulator and wherein a supply voltage is connected to the second terminal, the second terminal of the second resistor is connected to a supply input of the switching stage, and an output voltage is formed in a load connected at the supply input of the switching stage.

In another aspect there is provided a method for a voltage regulator, including a switching stage, for generating an output voltage, the method comprising controlling the switching stage with a feedback path, ramp-compensating a feedback signal in the feedback path, the ramp compensation being in dependence on an output of the switching stage.

BRIEF DESCRIPTION OF THE FIGURES

The invention is now described by way of reference to the accompanying figures, in which.

DESCRIPTION OF PREFERRED EMBODIMENTS

Examples are described in which a switched supply stage is controlled to generate an output voltage which tracks an input reference voltage. In the described examples the switched supply stage comprises a power stage comprising a pair of switches: a supply switch connected between a switching node and a supply voltage, and a ground switch connected between the switching node and electrical ground. In examples the supply voltage is a DC voltage, an example of which is a battery voltage. Other arrangements of a switching stage may be utilised, but this arrangement of a pair of switches is used for the purposes of description.

Such a switched supply stage may be utilised for providing a switched supply voltage in an envelope tracking power supply stage to a power amplifier. An envelope signal may be formed based on the input signal to be amplified, and the envelope signal provides a reference signal or reference voltage to the switched supply stage. The switched supply stage is used to generate an output voltage which provides a tracking power supply to the amplifier, the output voltage tracking the reference voltage provided by the envelope signal.

The amplifier powered via the switched supply stage may be used to amplify signals in radio frequency front end (RFFE) circuitry. The RFFE circuitry may be used to facilitate transmission and reception of signals in mobile devices. In some cases, the amplifier may be used to amplify a radio frequency (RF) signal prior to transmission via one or more antennas. In this case, the envelope signal generated via the switched supply stage may be generated based on the RF signal and used to power the amplifier.

An exemplary application is therefore the provision of an envelope tracking power supply for an amplifier, but this is not a limiting application. Other applications may be to provide a fixed DC supply for logic devices, such as processors, input/output devices, memories etc.

Figure 3:
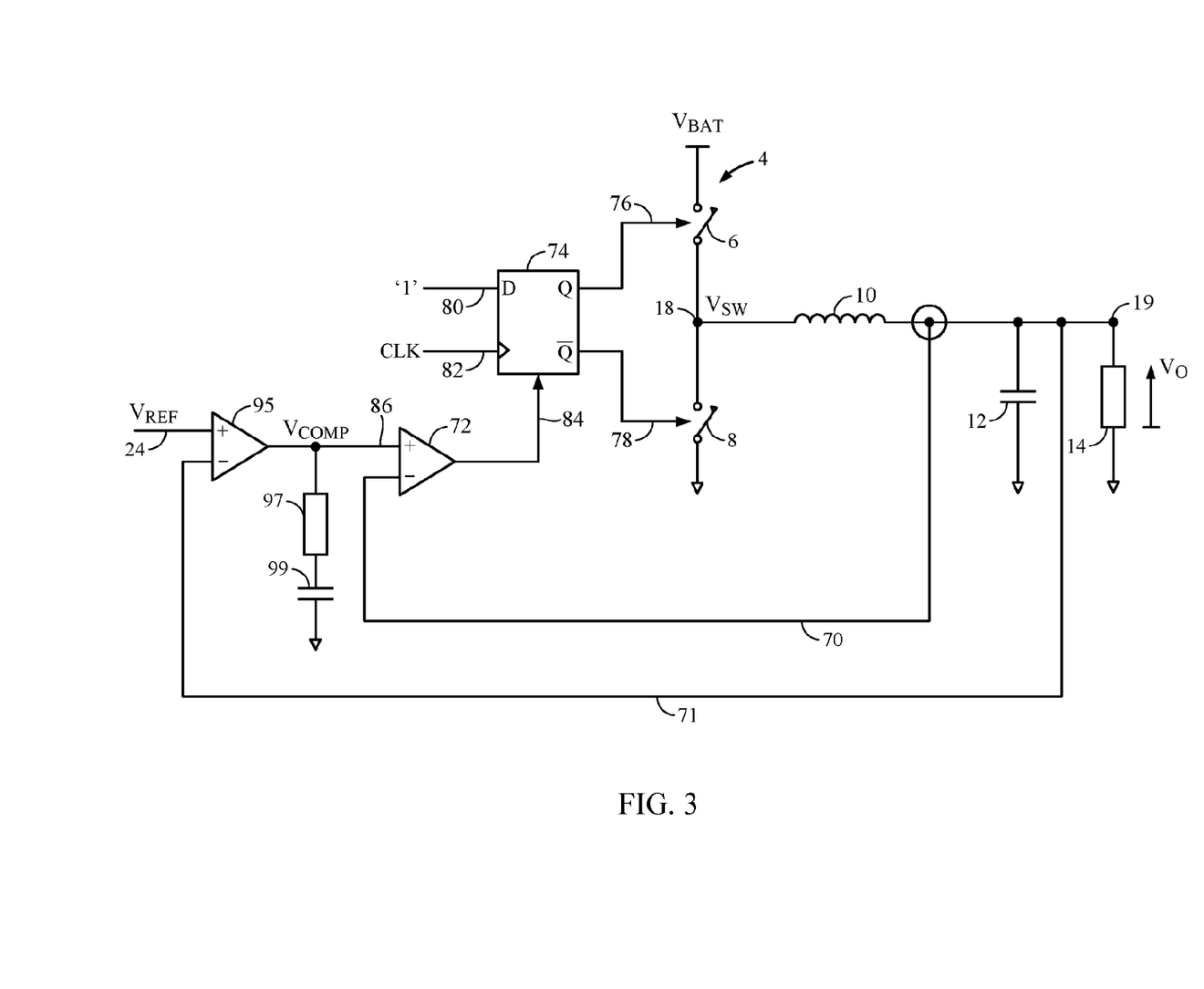
FIG. 3 illustrates an example schematic representation of the architecture of FIG. 2.

FIG. 3 illustrates an example implementation of the architecture of FIG. 2. Where elements shown correspond to elements of previous figures, like reference numerals are used.

In the example implementation of FIG. 3 there is provided a D-type flip-flop register 74. Other types of flip-flops may be used, and the D-type register is only an example. The switching stage 4 comprising the switches 4 and 8 is again provided, as is the inductor 10, the capacitor 12, and the load 14. Additionally provided is an amplifier 72, a resistor 97, a capacitor 99, and a compensation amplifier 95.

As shown in FIG. 3, the D-type flip-flop register 74 receives a high voltage at its data input denoted D on line 80. The D input of the flip-flop is thus held at a level '1'. A clock input of the D-type flip-flop receives a clock signal on line 82. A clear/reset input of the D-type flip-flop receives an output of the amplifier 72 on line 84. The Q and Qbar outputs of the D-type flip-flop register 74 provide control signals on lines 76 and 78 to control the respective switches 6 and 8 of the switching stage 4, to generate the signal $V_{SW}$ at the switched node 18.

The compensation amplifier 95 receives the reference voltage $V_{REF}$ on line 24, and the fed back output voltage $V_O$, or a representation of the fed back output voltage $V_O$, on line 71. The compensation amplifier 95 is a difference amplifier and subtracts the fed back representation of the output voltage $V_O$ from the reference voltage $V_{REF}$, and generates the amplified difference as a compensation voltage $V_{COMP}$ on line 86.

The compensation amplifier 95 is a voltage-to-current amplifier, and the resistor 97 and capacitor 99 are provided at the output of the amplifier 95 to generate the compensation voltage $V_{COMP}$. The resistor 97 and capacitor 99 from a compensation function with the amplifier 95 so that the compensation voltage $V_{COMP}$ is a function of the error between the output voltage and the reference voltage (the difference between what is wanted and what is actually present at the output).

The compensation voltage $V_{COMP}$ on line 86 is provided as one input to the amplifier 72. The other input to the amplifier 72 is a signal fed back from the detection of the current flowing in the inductor, $I_L$, on line 70. The amplifier 72 is a difference amplifier and subtracts a voltage representing the current flowing in the inductor 10 from the compensation voltage, and in dependence thereon generates the control signal to the clear/reset input of the D-type flip-flop. This operation can also be performed in the current domain instead of the voltage domain (the amplifier comparing two currents instead of comparing two voltages).

The output voltage $V_O$ is formed at the output node across the load as previously described.

Thus there is generated an indication of the error between the output voltage and the reference voltage, and there is then generated an indication of the error between this signal and a representation of the current flowing in the inductor.

A current controlled stage such as illustrated in FIG. 3 is subject to sub-harmonic instabilities. These instabilities occur when the duty-cycle of the converter is higher than 50% for a maxima-current control, and lower than 50% for a minima-current control. This reduces the output range of a current-controlled buck converter, and makes such a control scheme unsuitable for many applications.

FIGS. 4(a) to 4(c) illustrate the operation of the implementation of FIG. 3.

FIG. 4(a) illustrates the clock signal at the clock input to the D-type flip-flop 74. The clock signal is derived from any kind of oscillator. It is externally generated and with a D-type flip-flop the duty cycle does not matter. The clock cycle is a time period T from $t_1$ to $t_3$.

FIG. 4(b) illustrates the voltage $V_{SW}$ at the switching node 18. The signal at the switching node switches between $V_{BAT}$ and 0V (electrical ground). The clock cycle is T, and the pulse width at which the switching node is at $V_{BAT}$ is D×T. Thus the signal at the switching node is at VBAT from time $t_1$ to time $t_2$ (for a duration D×T), and at 0V from time $t_2$ to time $t_3$.

FIG. 4(c) illustrates the inductor current $I_L$ detected. As illustrated this signal is a ramp signal, rising when the switching node is at $V_{BAT}$, and falling when the switching node is at 0V. Thus from time $t_1$ the switch 6 is on and the switch 8 is off, and the signal representative of the inductor current $I_L$ ramps up. At time $t_2$ the signal is equal to the compensation voltage (detected by the amplifier 72) and the register 74 is controlled to switch the switch 6 off and the switch 8 on. Thus from time $t_2$ the signal representative of the inductor current ramps down, ramping down to zero at time t3 (the end of the clock cycle).

Also shown in FIG. 4(c) is the signal $V_{COMP}$, with which the signal based on the inductor current is compared. The signal $V_{COMP}$ is a falling signal, and as a result of the comparison of the amplifier 72 the ramp current signal switches from rising to falling whenever the ramp current meets the level $V_{COMP}$, due to the states of switches 6 and 8 changing.

It will be understood in FIG. 4(c) that the ramp signal is a voltage signal representative of the current $I_L$ in the inductor 10.

Referring to FIG. 4(c), as the signal representing the current IL in the inductor rises it is compared with the compensation voltage $V_{COMP}$. Whilst this signal is below $V_{COMP}$ the input on line 84 remains such that the input to the register 74 is 'clear'. When the signal becomes equal to $V_{COMP}$ the output of the amplifier 72 switches such that the register is reset, and the switches 6,8 are controlled to connect the inductor 10 to ground. Thus the signal representing the inductor falls. On the start of the next clock cycle the register 74 controls the witches to ramp up the inductor current.

Figure 4:
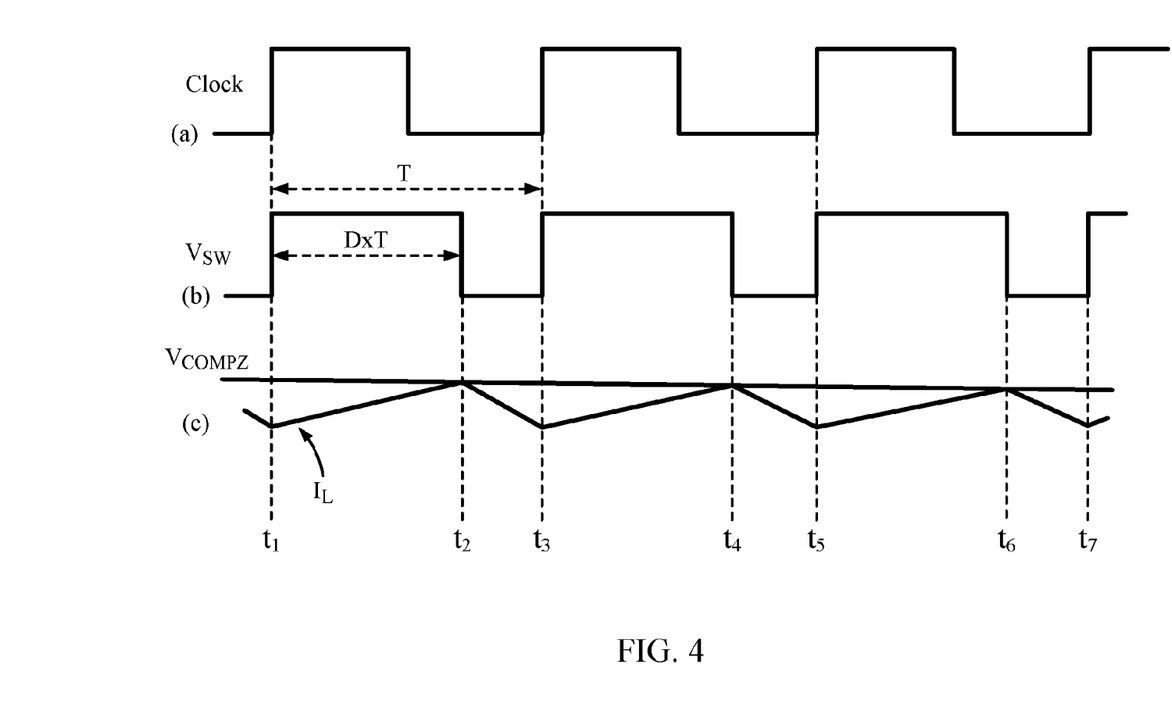
FIGS. 4(a) to 4(c) illustrate example signals in the example implementation of FIG. 3.

The timing diagrams of FIG. 4 show three clock cycles. Time $t_1$, $t_3$ and $t_5$ denote the start of each clock cycle, and times $t_3$, $t_5$ and $t_7$ denote the end of each clock cycle. Times $t_2$, $t_4$ and t6 represent the times within each of the three time periods shown when the switches 4,6 switch state.

Figure 5:
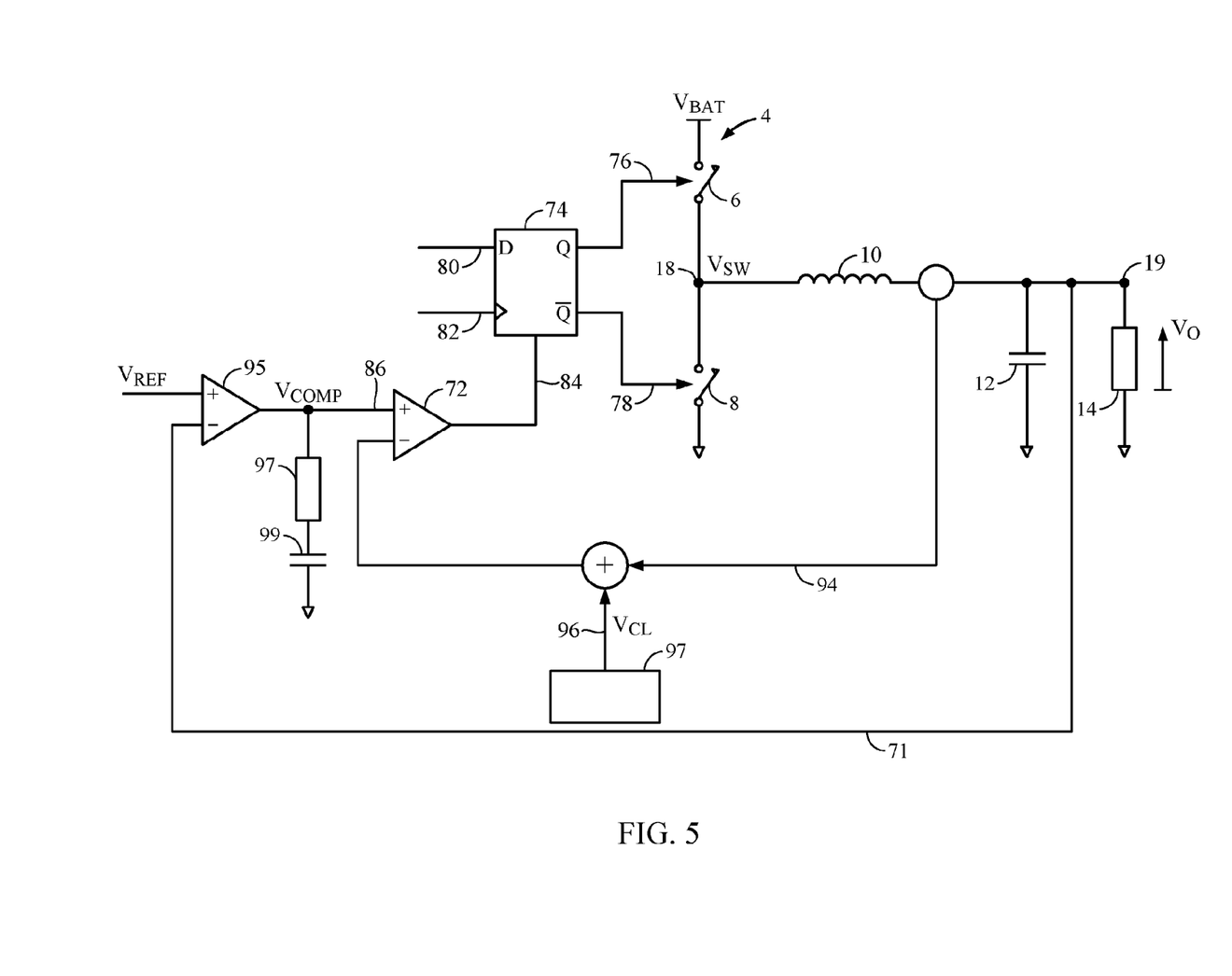
FIG. 5 illustrates an improvement to the example implementation of FIG. 3.

There are instabilities associated with the circuit of FIG. 3, and to address those instabilities the modified circuit arrangement of FIG. 5 is proposed. FIG. 5 illustrates a modification to the circuit arrangement of FIG. 3. Where elements of FIG. 5 correspond to elements of FIG. 3, like reference numerals are used.

FIG. 5 illustrates the introduction of slope compensation into the arrangement of FIG. 3.

The compensation voltage $V_{COMP}$ can go higher, but this does not change the duty cycle.

The circuit of FIG. 3 is modified such that a voltage $V_{IND}$ representing the detected current $I_L$ flowing in the inductor is provided on a line 94, and fed into one input of a combiner 92. The output of the combiner 92 is provided to the amplifier 72 which generates the input to the clear/reset input of the D-type flip-flop 74 as before.

A ramp signal $V_{CL}$ is provided on line 96 as a second input to the combiner 92 from a ramp generation block 97. This ramp can be a constant current charge of a condensator, or a transistor that tracks the reference oscillator internal ramp, an operational amplifier used as an integrator etc. The combiner 92 combines its two inputs to provide the signal to the amplifier 72.

Figure 6:
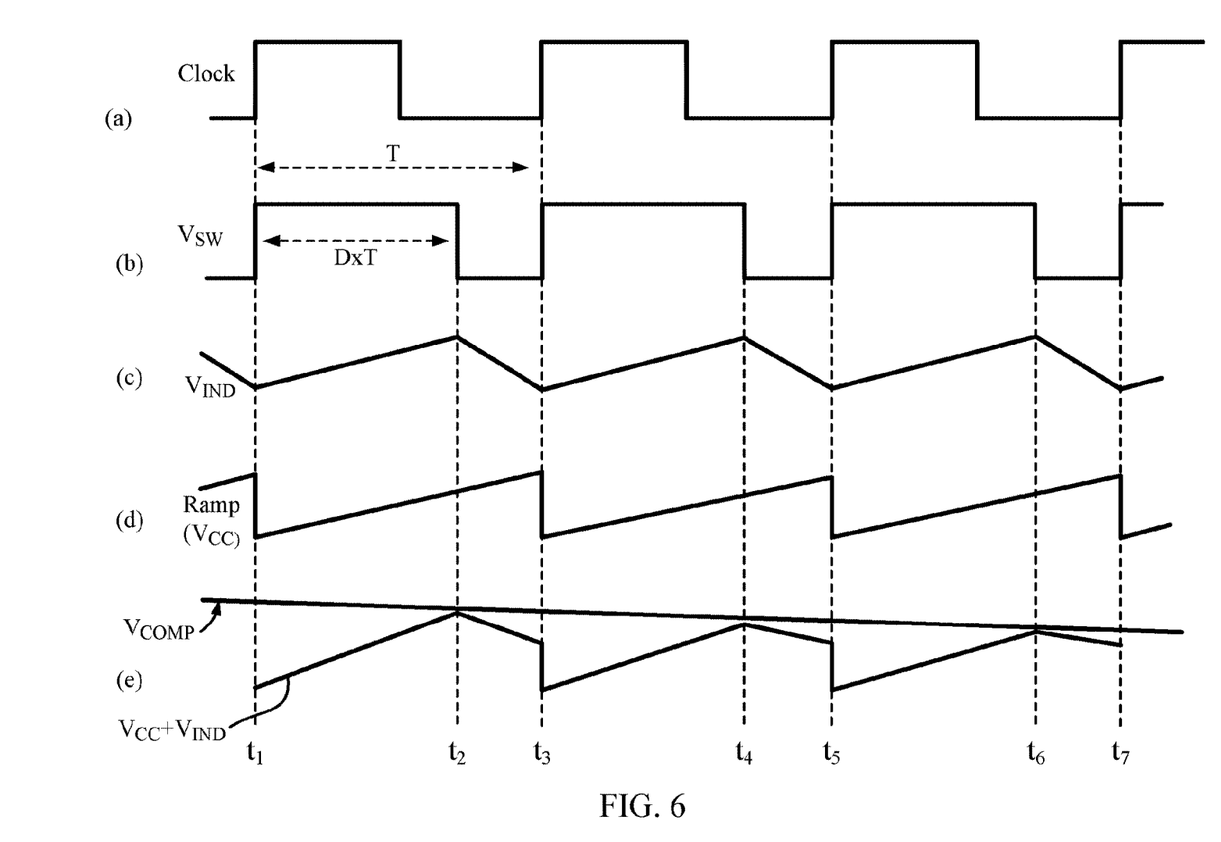
FIGS. 6(a) to 6(e) illustrate example signals in the example implementation of FIG. 5.

The operation of the circuit of FIG. 5 is further explained with reference to the waveforms illustrated in FIG. 6.

FIGS. 6(a) to 6(e) illustrate the operation of the implementation of FIG. 5.

FIG. 6(a) illustrates the clock signal at the clock input to the D-type flip-flop. The clock signal is derived from any kind of oscillator. It is again externally generated and again the duty cycle does not matter. The clock cycle is a time period T, from time $t_1$ to time $t_2$.

FIG. 6(b) illustrates the voltage $V_{SW}$ at the switching node 18. The signal at the switching node switches between $V_{BAT}$ and 0V (electrical ground). The clock cycle is T, and the pulse width at which the switching node is at $V_{BAT}$ is D×T. Thus the signal at the switching noise is at $V_{BATT}$ from time $t_1$ to time $t_2$ (for a duration D×T), and at 0V from time $t_2$ to time $t_3$.

FIG. 6(c) illustrates a representation of the inductor current $I_L$ detected, as represented by the voltage signal $V_{IND}$. As illustrated this signal is a ramp signal, rising when the switching node is at $V_{BAT}$, and falling when the switching node is at 0V. From time $t_1$ the switch 6 is on and the switch 8 is off, and the signal representative of the inductor current IL ramps up. At time $t_2$ the signal is equal to the compensation voltage (detected by the amplifier 72) and the register 74 is controlled to switch the switch 6 off and the switch 8 on. Thus from time $t_2$ the signal representative of the inductor current ramps down, ramping down to zero at time $t_3$ (the end of the clock cycle).

FIG. 6(d) illustrates the ramp signal generated by the ramp generator 97 on line 96, i.e. the signal $V_{CL}$. This ramp signal has a ramp-up portion throughout the clock cycle, and at the end of the time clock cycle to zero and ramps up again. Thus the ramp ramps up from zero at time $t_1$, and at time $t_3$ rests to zero.

FIG. 6(e) illustrates the signal at the output of the combiner 92, being the combination of the signals on lines 94 and 96—or the signal of FIG. 6(c) and FIG. 6(d).

As shown in FIG. 6(e), the signal ramps up from time t1. At time t2 the signal becomes equal to the compensation signal $V_{COMP}$ and the switch 6 is turned off and the switch 6 is turned on. The inductor 10 thus discharges and the ramp decreases from time $t_2$ to the end of the clock cycle at time $t_3$. The falling ramp is a combination of the falling ramp of FIG. 6(c) and the rising ramp of FIG. 6(d) during this period. At time $t_3$ the signal at the input to the amplifier 72 resets to zero.

Also shown in FIG. 6(e) is the signal $V_{COMP}$, with which the signal based on the inductor current is compared. The signal $V_{COMP}$ is illustrated as a falling signal, although in practice is a varying signal which varies up or down, and as a result of the comparison of the amplifier 72 the ramp current signal switches from rising to falling whenever the representation of the ramp current meets the level $V_{COMP}$. Then the register 72 is reset and the inductor discharged to the end of the clock cycle. At the end of the clock cycle the signal is reset and begins to ramp up again.

Thus the signal $V_{CL}+V_{IND}$ at the input of the comparison amplifier 72 rises until it is equal to the level of the signal $V_{COMP}$ on line 86, thereafter the set/clear signal to the flip-flop 74 is changed by the comparison amplifier 72, and the current in the inductor consequently falls.

There is thus provided an additional stage which comprises combining the measured current flowing in the inductor with a ramp, and feeding the combined signal to the input of the comparison amplifier.

This slope compensation overcomes sub-harmonic instability issues. A slope is added to the sensed current by the combiner 92 and makes the converter stable. The added slope may be proportional to the output voltage in order to achieve constant rejection of the sub-harmonic issues. However the implementation of the variable slope compensation circuit is difficult, and requires several operational amplifiers, adders, etc. This increases power consumption as well as silicon area.

Figure 7:
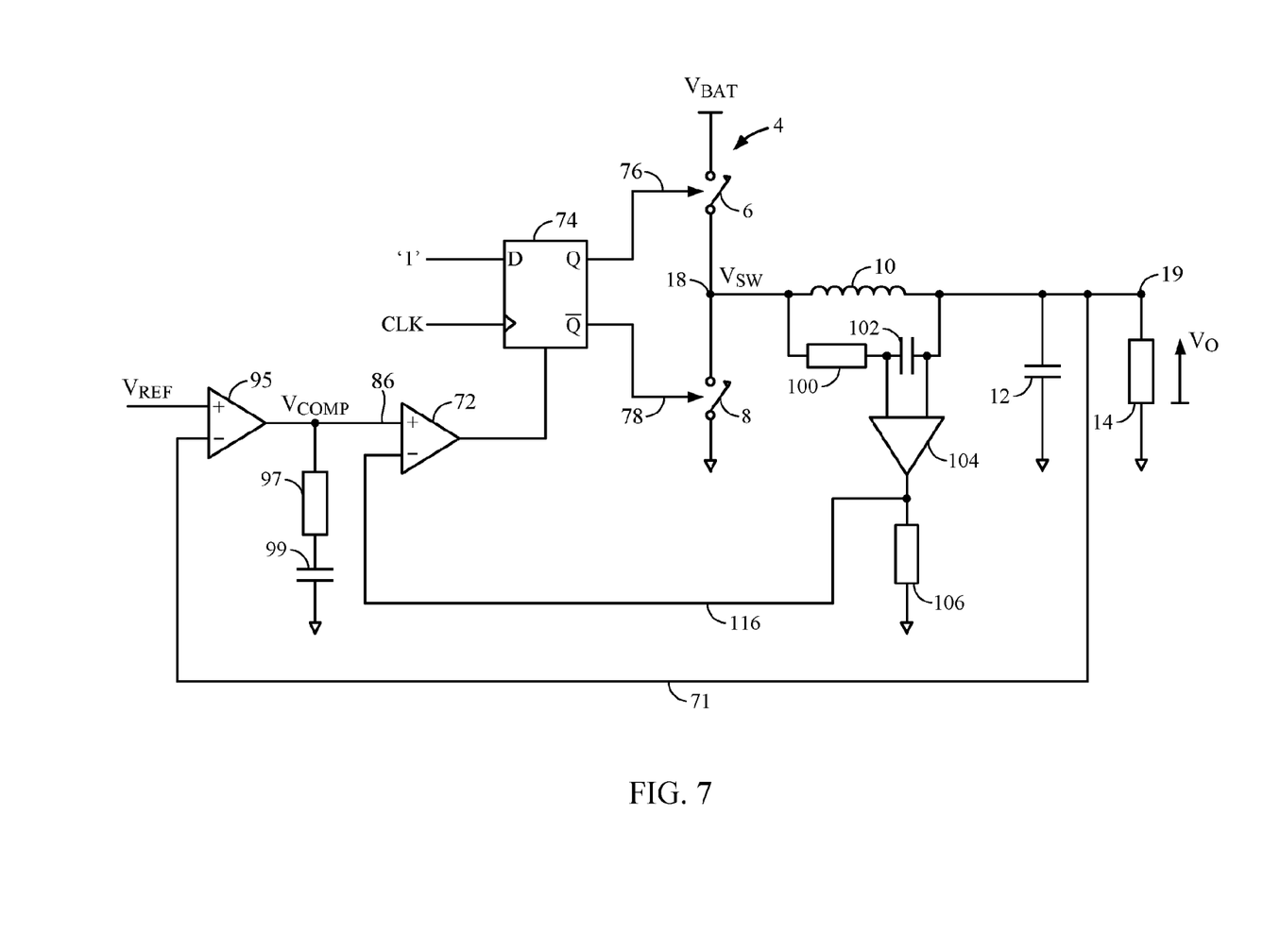
FIG. 7 illustrates an improvement to the example implementation of FIG. 5.

In order to implement the circuit arrangement of FIG. 5, the current flowing in the inductor must be measured. A series connected resistor-capacitor (R/C) network, with the network in parallel with the coil as shown in FIG. 7, may be used for this. Any element of FIG. 7 which corresponds to an element of an earlier figure is denoted by the same reference numeral.

By providing a series connected resistor and capacitor in parallel with the inductor, a measure of the current flowing in the inductor can be obtained.

As shown in FIG. 7, a capacitor 102 is connected to the output node 19, and a resistor 100 is connected to the switched node 18, and the capacitor 100 and resistor 102 are connected together. The capacitor and resistor 102 and 100 are connected in series across the inductor 10.

A small transconductance amplifier 104 (or differential amplifier) is connected in order to measure the current flowing in the inductor. The transconductance amplifier 104 has its inputs connected across the capacitor 102 of the resistor-capacitor connection 100-102. A first input leg of the amplifier 104 is connected to the interconnection of the resistor 100 and the capacitor 102, and a second input leg of the amplifier 104 is connected to the output node 19.

The output of the transconductance amplifier 104 is connected to one terminal of a resistor 106, the other terminal of the resistor 106 being connected to electrical ground. A voltage representing the current flowing in the capacitor 102 is thus formed at the output of the amplifier 104.

A measure of the current flowing in the inductor 10 is thus provided at the output of the transconductance amplifier 104 on line 116. The voltage at the output of the transconductance amplifier 104 is proportional to the current in the inductor 10.

The voltage generated at the output of the transconductance amplifier 104 across its output load 106 may then be used to provide a voltage indicative of the current flowing in the inductor 10. The voltage formed at the output of the transconductance amplifier 104 may thus be provided to the amplifier 72 which forms an input to the D-type flip-flop.

The FIG. 7 arrangement thus provides for the inductor current to be sensed in accordance with the implementation of FIG. 3. In order to further modify FIG. 7 to implement the arrangement of FIG. 5, further circuitry is required to process the output signal of the transconductance amplifier 104 before it is provided to the amplifier 72. This circuitry requires a lot of bulk components.

Figure 8:
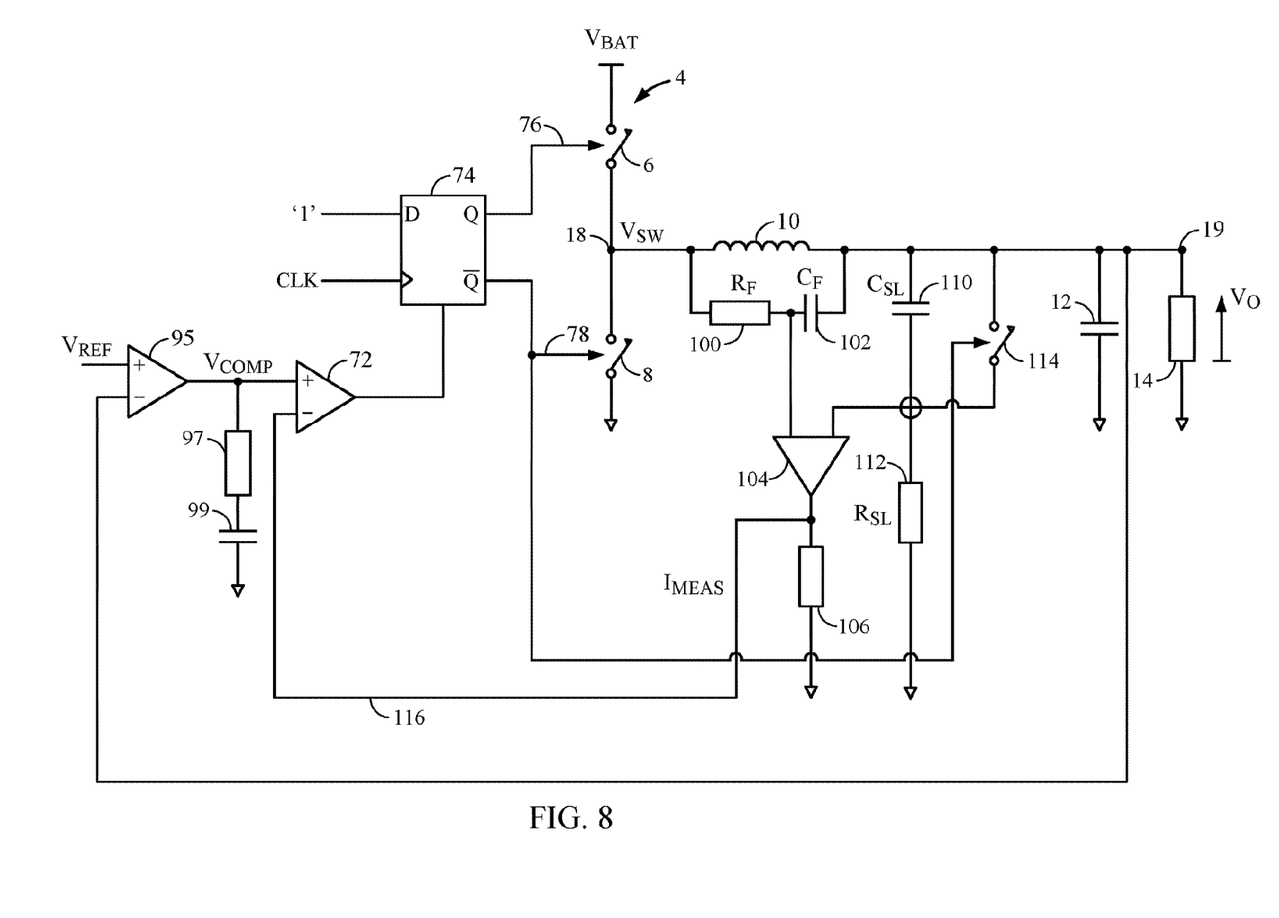
FIG. 8 illustrates an improvement to the example implementation of FIG. 7.

FIG. 8 illustrates a modification which avoids the need for such bulk circuitry. In FIG. 8 a small further capacitor 110, a further resistor 112, and a switch 114 are added to the arrangement of FIG. 7, in order to achieve an operation consistent with FIG. 5 and FIGS. 6(a) to 6(e). Elements of FIG. 8 which correspond to previous figures are denoted by like reference numerals.

The resistor 100 and capacitor 102 are annotated $R_F$ and $C_F$ respectively, and the resistor 112 and capacitor 110 are annotated $R_{SL}$ and $C_{SL}$ respectively.

The small further capacitor 110 is connected between the output node 19 and the further resistor 112, the other terminal of the further resistor 112 being connected to electrical ground. The first input leg to the amplifier is provided, as before, from the interconnection of the resistor 100 and the capacitor 102. The second input leg to the transconductance amplifier 104 is provided by the connection point of the further capacitor 102 with the further resistor 100.

A switch 114 is provided in parallel with the further capacitor 110.

The output of the transconductance amplifier 104 is connected to the comparing amplifier 72 which provides the clear/reset input to the D-type flip-flop 74.

The voltage across the capacitor 102 is proportional to the output current at the beginning of a cycle. The amplifier 104 adds current information plus a slope from the switched capacitor 110. The switched capacitor provides the slope when the switch 114 is open. The slope depends only on the output voltage. Best slope compensation is achieved when the slope is proportional to the output voltage. If the output voltage is low, then the slope is low. If the output voltage is high, then the slope is high.

This operation is consistent with the generation of a ramp compensated signal in accordance with FIG. 6(e).

By matching the resistance values of the resistors 100 and 112, and by matching the capacitance values of the capacitors 102 and 110, control is achieved to allow modulation of the slope-compensation ratio by simply adjusting the passive-component matching ratios.

The switch 114 is controlled by the control signal 78 which controls the ground switch 8 of the switching stage, so when the ground switch 8 is off, the switch 114 is off. Thus when the supply switch 6 is on, the switch 114 is off.

The slope of the ramp signal is the slope of the signal in capacitor 102 (proportional to the coil current) plus the slope of the signal in capacitor 110 (proportional to the output voltage).

When the ground switch 8 is on, the switch 1114 is on. This discharges the slope-compensation circuit and the slope is proportional to the coil current.

Figure 9:
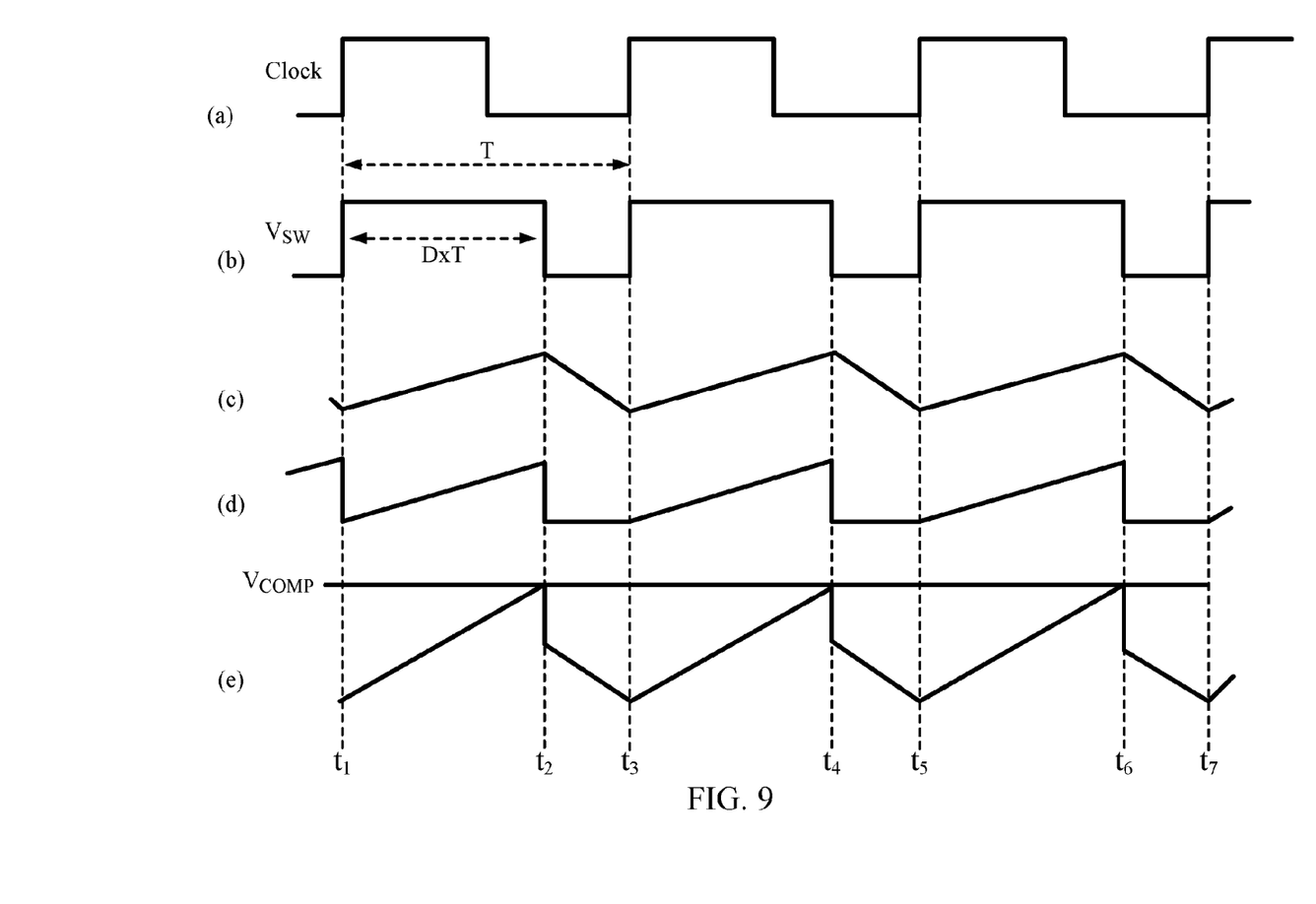
FIGS. 9(a) to 9(e) illustrate example signals in the example implementation of FIG. 8.

FIGS. 9(*a*) to 9(*e*) illustrate the operation of the circuit of FIG. 8.

FIG. 9(*a*) illustrates the clock signal at the clock input to the D-type flip-flop. The clock signal is derived from any kind of oscillator. It is again externally generated and again the duty cycle does not matter with a D-type flip-flop. The clock cycle is a time period T, from time $t_1$ to time $t_2$.

FIG. 9(*b*) illustrates the voltage $V_{SW}$ at the switching node 18. The signal at the switching node switches between $V_{BAT}$ and 0V (electrical ground). The clock cycle is T, and the pulse width at which the switching node is at $V_{BAT}$ is D×T. Thus the signal at the switching node is at VBAT from time $t_1$ to time $t_2$ (for a duration D×T), and at 0V from time $t_2$ to time $t_3$.

FIG. 9(*c*) illustrates a representation of the inductor current $I_L$ detected, as represented by a voltage present on a first input to the amplifier 104. This is the signal generated as a result of the detection at the node to which the resistor 100 and the capacitor 102 are commonly connected. As illustrated this signal is a ramp signal, rising when the switching node is at $V_{BAT}$, and falling when the switching node is at 0V. From time $t_1$ the switch 6 is on and the switch 8 is off, and the signal representative of the inductor current IL ramps up. At time $t_2$ the signal is equal to the compensation voltage (detected by the amplifier 72) and the register 74 is controlled to switch the switch 6 off and the switch 8 on. Thus from time $t_2$ the signal representation of the inductor ramps down, ramping down to zero at time $t_3$ (the end of the clock cycle).

FIG. 9(*d*) illustrates a ramp signal generated for the second input to the amplifier 104. As illustrated, when the switch 114 is open (and the switch 8 is open and the switch 6 is closed), a ramp signal is generated on this signal line. This ramp signal has a gradient determined by the time constants of the resistor 100 and capacitor 102 combination, and the resistor 112 and capacitor 110 combination.

When the switch 8 is closed (and the switch 6 is opened), the switch 114 is closed. |There is then no ramp signal generated to the second input to the amplifier 104.

Thus there is a signal which is a ramp signal which ramps up when the switch 6 is closed, and which is zero volts when the switch 8 is closed.

From time $t_1$ the signal ramps up to time $t_2$. At time $t_2$ the ramping up terminates, and the signal is reset to zero, and remains at zero until time $t_3$. Time $t_2$ is the time at which the switches 6 and 8 change state, and represents the time at which the switch 114 is closed.

From time $t_1$ the signal ramps up to time $t_2$. This ramp is a combination of the ramp-up of the signals of both FIGS. 9(*c*) and 9(*d*). At time $t_2$ the signal drops by a level, following the ramp of FIG. 9(*d*) dropping to zero. This signal from time $t_2$ to time $t_3$ is then the signal of FIG. 9(*a*), being a falling ramp.

FIG. 9(*e*) illustrates the signal which is generated at the output of the amplifier 104, which is the sum of the signals at its two inputs, i.e. the sum of the signals in FIGS. 9(*c*) and 9(*d*).

There is thus provided an additional stage which comprises measuring the current flowing in the inductor, and combining that current with a ramp, and feeding the combined signal to the input of the comparison amplifier.

Figure 10:
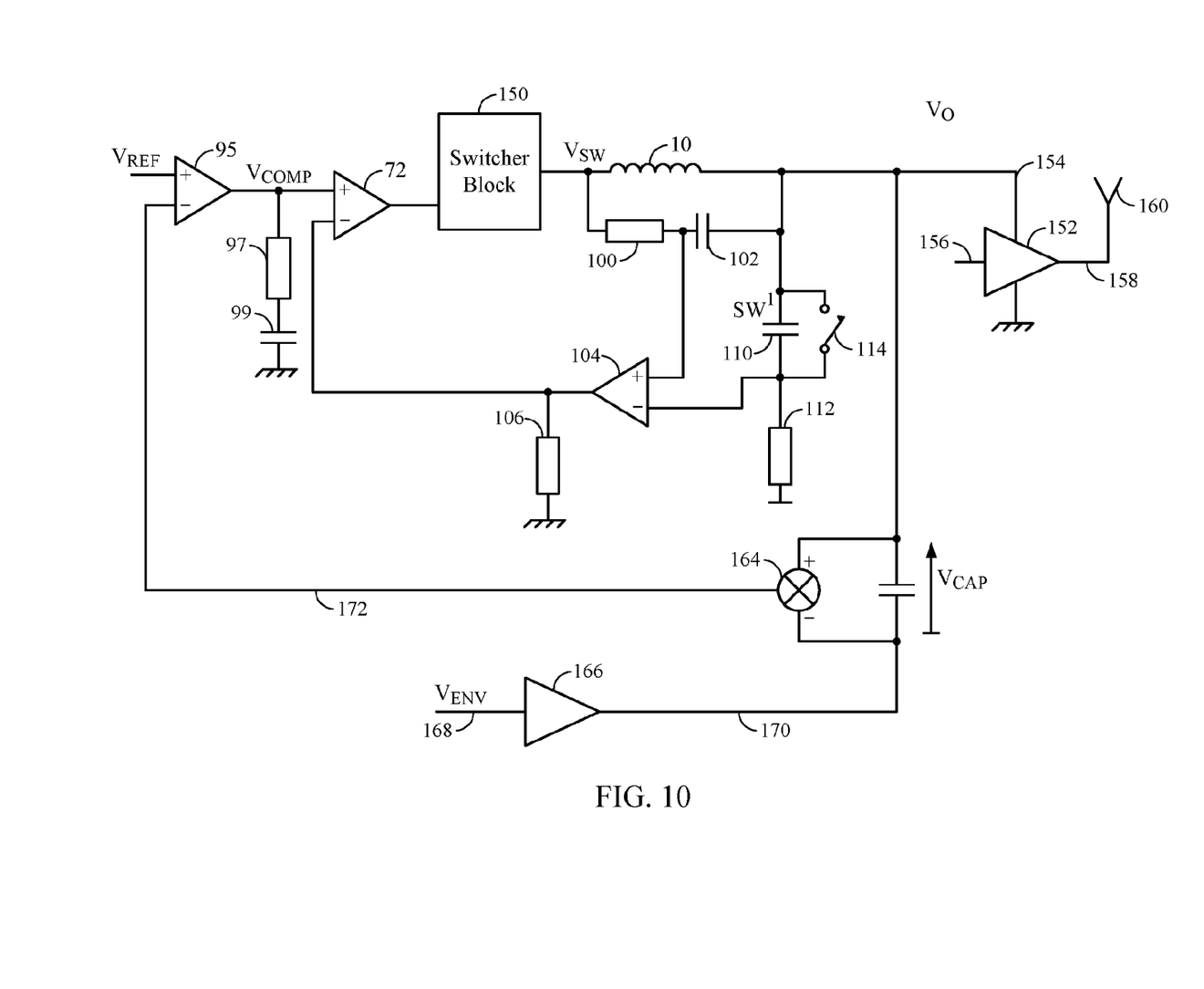
FIG. 10 illustrates an example implementation in an envelope tracking scenario.

With reference to FIG. 10, there is illustrated an application of the foregoing principles in an envelope tracking implementation. Where elements correspond to elements in foregoing figures, like reference numerals are used.

As shown in FIG. 10, there is provided a linear amplifier 166, a capacitor 162, a comparator 164, and an RF (radio frequency) power amplifier 152.

The RF power amplifier 152 receives an RF input signal on line 156, and generates an RF output signal on line 158. The RF output signal on line 158 is connected to an antenna 160.

The output voltage $V_O$ provides the supply voltage on line 154 to the RF power amplifier 152.

An envelope of the RF input signal on line 156 is provided on line 168 to the input of the linear amplifier 166. The output of the linear amplifier 166 on line 170 is connected to one terminal of the capacitor 162. The other terminal of the capacitor 162 is connected to the output voltage $V_O$. The output voltage $V_O$ is connected to the second terminal of the inductor 10, the first terminal of the inductor 10 being connected to the switching voltage $V_{SW}$.

A switcher block 150 represents the register 74 and the switches 6 and 8 of the FIG. 8 arrangement. The switcher block 150 thus receives the output of the amplifier 72, and generates the switching voltage $V_{SW}$.

A voltage $V_{CAP}$ is formed across the capacitor 162, and this formed voltage is detected by the comparator 164 which generates a representation of the voltage across the capacitor on line 172.

The reference voltage $V_{REF}$ represents the desired voltage to be established across the capacitor 162, such that the compensation voltage $V_{COMP}$ represents a difference between the desired voltage and the actual voltage across the capacitor 162.

In the foregoing description, a buck circuit has been implemented. Using the described techniques boost circuitry may also be provided.

Figure 11A:
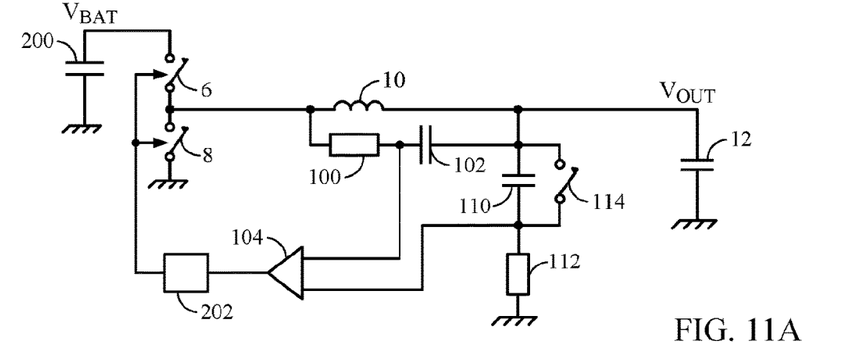
FIG. 11(a) illustrates an example implementation of voltage buck regulator.

With reference to FIG. 11(*a*), there is illustrated a buck control circuit in accordance with the foregoing principles. Where elements corresponding to elements of previous drawings are shown, like reference numerals are used.

A supply voltage is provided by a battery voltage VBAT, on line 202 to one terminal of switch 6. A capacitor 200 is connected between electrical ground and a terminal of switch 6 to provide the voltage $V_{BAT}$.

The other terminal of switch 6 is connected to a terminal of switch 8, and the other terminal of switch 8 is connected to electrical ground. The switches 6 and 8 are connected by a switcher control block 202, which may control the switcher in accordance with the described foregoing arrangements. The input to the switcher control block 202 is provided by the amplifier 104. The amplifier 104, capacitors 102, 112 and resistors 100,110 are connected as described above. The switch 114 is also shown.

The switcher control block 202 controls the switching stage comprised on switches 6 and 8 in dependence upon the signal from the output of the amplifier 104, which is a ramp-compensated feedback signal. The ramp compensation is, in accordance with the foregoing, generated in dependence on the output of the buck stage.

The arrangement of FIG. 11(*a*) is a buck stage in accordance with the foregoing arrangements. A boost stage may also be provided.

Figure 11B:
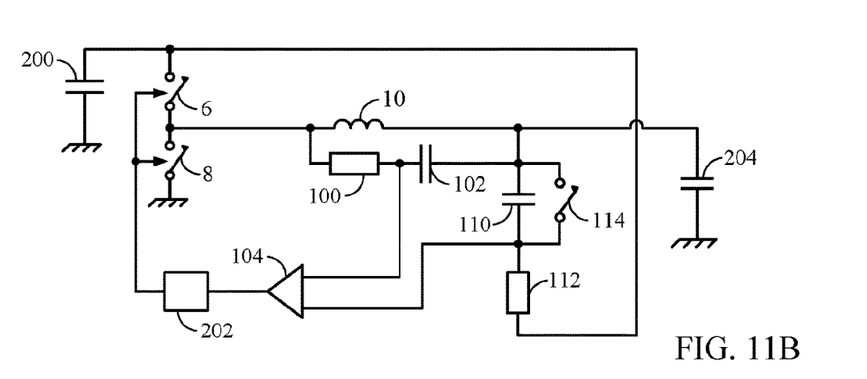
FIGS. 11(b) and 11(c) illustrates an example implementation of a voltage boost regulator.

With reference to FIG. 11(b), the arrangement of FIG. 11(a) is modified to provide a boost circuit. The connection of the resistor 112 is adjusted, so that the second ermanila of the resistor 112 is connected to the first terminal of the switches 6, rather than electrical ground. The capacitor 12 is replaced with a capacitor 204 which provided a supply (battery) voltage. An output voltage is then formed across the capacitor 200.

Figure 11C:
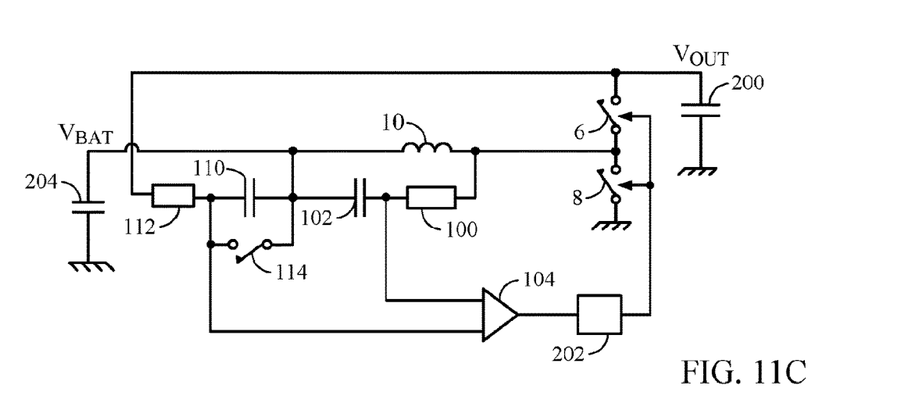

FIG. 11(c) illustrates a rearrangement of the circuit of FIG. 11(b), with the capacitor 204 provided on the left hand side and the capacitor 200 provided on the right hand side.

FIG. 11(a) is a circuit for providing shape compensation in a buck converter to give a regulated buck. FIG. 11(c) is a circuit providing shape compensation in a boost converter to give a regulated boost.

The invention has been described by way of reference to particular examples, but is not limited to the detail of any example, not is it limited to any detail of an example only be used in combination with another detail. Aspects of the examples may be used with the invention separately or in combination.

The invention claimed is:

1. A voltage regulator comprising:
   a switching stage;
   an inductive element coupled between the switching stage and an output of the voltage regulator; and
   a feedback path configured to control the switching stage, wherein the feedback path comprises:
   an amplifier;
   a first resistive element having a first terminal coupled to a first terminal of the inductive element;
   a first capacitive element having a first terminal coupled to a second terminal of the inductive element, a second terminal of the first resistive element and a second terminal of the first capacitive element being coupled to a first input of the amplifier; and
   a switch coupled between a second input of the amplifier and the second terminal of the inductive element.

2. The voltage regulator of claim 1, wherein a feedback signal is generated by the feedback path to control the switching stage, the feedback signal being generated by applying a ramp compensation to a signal representing a current flowing to the output of the voltage regulator.

3. The voltage regulator of claim 2, wherein the signal representing the current flowing to the output of the voltage regulator is generated by measuring a voltage difference across the first capacitive element.

4. The voltage regulator of claim 1, further comprising:
   a second capacitive element having a first terminal connected to the second terminal of the inductive element; and
   a second resistive element having a first terminal connected to a second terminal of the second capacitive element.

5. The voltage regulator of claim 4, further comprising:
   a feedback comparator having a first input connected to a connection point between the first resistive element and the first capacitive element, and having a second input connected to another connection point between the second capacitive element and the second resistive element, an output of the feedback comparator being connected to a control input of the switching stage.

6. The voltage regulator of claim 5, wherein:
   the switch is connected in parallel with the second capacitive element;
   when the switch is closed, the feedback comparator is configured to generate, at the output of the feedback comparator, a feedback signal representing a current flowing across the inductive element; and
   when the switch is open, the feedback comparator is configured to generate, at the output of the feedback comparator, a ramp compensated feedback signal.

7. The voltage regulator of claim 6, wherein the switch is closed when the first terminal of the inductive element is connected to electrical ground via the switching stage, and the switch is open when the first terminal of the inductive element is connected to a voltage rail via the switching stage.

8. The voltage regulator of claim 1, further comprising:
   a first comparator configured to compare an output voltage of the voltage regulator with a reference voltage to provide a comparison voltage; and
   a second comparator configured to compare the comparison voltage with a feedback signal generated by the feedback path and provide a control signal for the switching stage based on the comparison of the comparison voltage with the feedback signal.

9. The voltage regulator of claim 8, further comprising:
   a linear amplifier; and
   a power amplifier, the power amplifier being configured to receive a signal to be amplified, and the linear amplifier being configured to receive an envelope of the signal to be amplified;
   a third capacitive element connected between an output of the linear amplifier and the second terminal of the inductive element, wherein the second terminal of the inductive element is connected to a power supply input of the power amplifier; and
   a third comparator connected in parallel with the third capacitive element and having an output connected to the first comparator, wherein the reference voltage is indicative of a desired voltage to be developed across the third capacitive element.

10. The voltage regulator of claim 4, wherein a second terminal of the second resistive element is connected to electrical ground.

11. A method for voltage regulation, comprising:
    generating a first signal representing a current flowing to an output of a voltage regulator, and a second signal having a slope that is based on an output voltage of the voltage regulator;
    generating a feedback signal based on the first signal and the second signal; and
    controlling a switching stage of the voltage regulator with the feedback signal to generate the output voltage.

12. The method of claim 11, wherein the voltage regulator comprises:
    an inductive element having a first terminal connected to the switching stage and a second terminal connected to the output of the voltage regulator;
    a first resistive element having a first terminal connected to the first terminal of the inductive element; and
    a first capacitive element having a first terminal coupled to the second terminal of the inductive element, a second terminal of the first resistive element and a second terminal of the first capacitive element being coupled together, the first signal being generated at the second terminal of the first capacitive element.

13. The method of claim 12, wherein the voltage regulator further comprises:
    a second capacitive element having a first terminal connected to the second terminal of the inductive element; and a second resistive element having a first terminal connected to a second terminal of the second capacitive element, the method further comprising generating the second signal via the second capacitive element and the second resistive element.

14. The method of claim 13, wherein the voltage regulator further comprises:
a feedback comparator having a first input connected to a connection point between the first resistive element and the first capacitive element, the method further comprising providing the second signal to a second input of the feedback comparator, the feedback signal being generated at an output of the feedback comparator.

15. The method of claim 14, further comprising:
closing a switch connected in parallel with the second capacitor to generate another feedback signal representing the current flowing to the output of the voltage regulator, the switching stage being controlled via the other feedback signal when the switch is closed; and
opening the switch connected in parallel with the second capacitor to generate the feedback signal, the switching stage being controlled via the feedback signal when the switch is open.

16. The method of claim 15, wherein the switch is closed when the first terminal of the inductive element is connected to electrical ground, and the switch is open when the first terminal of the inductive element is connected to a voltage rail.

17. The method of any one of claims 12 to 16, further comprising:
comparing the output voltage with a reference voltage to provide a comparison voltage;
comparing the comparison voltage with the feedback signal; and
providing a control input to the switching stage based on the comparison of the comparison voltage with the feedback signal.

18. The method of claim 17, further comprising:
receiving a signal to be amplified at an input of a power amplifier; and
receiving an envelope of the signal to be amplified at an input of a linear amplifier, wherein:
the voltage regulator comprises a third capacitive element connected between an output of the linear amplifier and the second terminal of the inductive element, wherein the second terminal of the inductive element is connected to a power supply input of the power amplifier,
the method further comprises detecting a voltage across the third capacitive element; and
the comparison of the output voltage with the reference voltage comprises comparing the detected voltage across the third capacitor with the reference voltage, the reference voltage being indicative of a desired voltage to be developed across the third capacitive element.

19. The method of claim 13, wherein a second terminal of the second resistive element is connected to electrical ground.

* * * * *